(12) United States Patent
Inagaki et al.

(10) Patent No.: US 10,642,142 B2
(45) Date of Patent: May 5, 2020

(54) CONTROL APPARATUS, CONTROL METHOD FOR SAME, PROJECTION DEVICE, AND PROJECTION SYSTEM

(71) Applicant: CANON KABUSHIKI KAISHA, Tokyo (JP)

(72) Inventors: Kensuke Inagaki, Tokyo (JP); Makiko Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/288,446

(22) Filed: Feb. 28, 2019

(65) Prior Publication Data

US 2019/0278164 A1 Sep. 12, 2019

(30) Foreign Application Priority Data

Mar. 6, 2018 (JP) .................. 2018-039643

(51) Int. Cl.
*G03B 21/26* (2006.01)
*G03B 21/16* (2006.01)
*G03B 21/18* (2006.01)
*G03B 21/14* (2006.01)

(52) U.S. Cl.
CPC .......... *G03B 21/26* (2013.01); *G03B 21/145* (2013.01); *G03B 21/16* (2013.01); *G03B 21/18* (2013.01)

(58) Field of Classification Search
CPC ........ G03B 21/16; G03B 21/18; G03B 21/26; G03B 21/53; G03B 21/56; G03B 21/145; G03B 21/147; G03B 21/565; H04N 9/3147; H04N 9/3182; H04N 9/3185; H04N 9/3194; H04N 9/4307

See application file for complete search history.

(56) References Cited

U.S. PATENT DOCUMENTS

| 2008/0143969 | A1* | 6/2008 | Aufranc | G03B 21/26 353/30 |
| 2012/0050698 | A1* | 3/2012 | Kotani | G03B 21/14 353/94 |
| 2013/0229629 | A1* | 9/2013 | Kawamoto | H04N 9/31 353/30 |
| 2013/0321781 | A1* | 12/2013 | Aruga | G03B 21/142 353/94 |
| 2019/0122383 | A1* | 4/2019 | Takao | G06T 7/74 |

FOREIGN PATENT DOCUMENTS

| JP | 2011-151640 A | 8/2011 |
| JP | 2013-205686 A | 10/2013 |
| JP | 2017-138472 A | 8/2017 |

* cited by examiner

*Primary Examiner* — Sultan Chowdhury
(74) *Attorney, Agent, or Firm* — Cowan, Liebowitz & Latman, P.C.

(57) ABSTRACT

A control apparatus that controls a projection area of each of projection devices is provided. The control apparatus notifies relating to control of the projection areas, in a case where a temperature variation of at least one projection device, among the projection devices, is greater than or equal to a threshold value.

15 Claims, 9 Drawing Sheets

CONTROL APPARATUS, CONTROL METHOD FOR SAME, PROJECTION DEVICE, AND PROJECTION SYSTEM

BACKGROUND OF THE INVENTION

Field of the Invention

The present invention relates to a control apparatus, a control method for the same, a projection device and a projection system, and more particularly to a technology for controlling a projection area.

Description of the Related Art

Stack projection and multi-screen projection are known projection methods that use a plurality of projection devices (projectors). Stack projection is a projection method that makes the projection areas coincident or shifts the projection areas very slightly (less than pixel pitch) with respect to each other. Stack projection is used for the purpose of expanding the dynamic range of the projected image, enhancing the luminance of the projected image, and/or enhancing the resolution of the projected image. Also, multi-screen projection is a projection method that arranges the projection areas side-by-side. Multi-screen projection is used for the purpose of enlarging the projection area without lowering the resolution or brightness of the projected image.

In the case of performing stack projection and multi-screen projection, the projection position of the individual projectors needs to be adjusted with high precision. For this purpose, there is a known projection position adjustment system that performs projection position adjustment software with a personal computer (PC) communicably connected to the plurality of projectors, and adjusts the projection position of the individual projectors.

A projector has heat sources including a light source. Thus, the temperature of the projector varies temporally, due to the light source being started up, from a cold state before the light source is started up (state where the temperature of the entire projector is equivalent to the outside air temperature). The variation in temperature of the projector may cause the projection position to be unstable due to members of the projector thermally expanding. Thus, a technology for performing real-time adjustment of the change in projection position caused by the variation in temperature has been proposed (Japanese Patent Laid-Open No. 2011-151640, paragraphs [0085] and [0087]).

However, with the technology of Japanese Patent Laid-Open No. 2011-151640, in the case of using a plurality of projectors, the individual projectors need to be installed in advance such that an appropriate projection position is achieved in a thermal equilibrium state. Thus, this technology is not effective at the time of determining the installation position of a plurality of projectors, and it is necessary to wait for the individual projectors to achieve a thermal equilibrium state before determining the installation position so as to achieve an appropriate projection position.

Thus, there was a problem in that when a user determines the installation position of a projector at a time that the projector is not in a thermal equilibrium state, the projection position in the thermal equilibrium state will shift from the appropriate position even when the real-time adjustment function is active, and the projection position adjustment performed at the time of installation will have been pointless.

SUMMARY OF THE INVENTION

The present invention at least reduces such problems with conventional technologies, and provides a control apparatus, a control method for the same, a projection device and a projection system that are capable of suppressing performance of control relating to a projection area of a projection device in a state that is not suitable for performance.

According to an aspect of the present invention, there is provided a control apparatus that controls a projection area of each of projection devices, wherein the control apparatus includes at least one or more processors and/or at least one or more electronic circuits configured to execute operations of each of the following units: a control unit configured to control the projection area of each of the projection devices; and a notification unit configured to perform notification relating to control of the projection areas, in a case where a temperature variation of at least one projection device, among the projection devices, is greater than or equal to a threshold value.

According to another aspect of the present invention, there is provided a projection device for projecting an image onto a projection area, comprising: at least one or more processors and/or at least one or more electronic circuits that perform operations of each of the following units: a control unit configured to control a shape or a position of the projection area; a determination unit configured to determine whether a temperature variation of the projection device satisfies a predetermined condition; and a notification unit configured to perform predetermined notification relating to control of the projection area, in a case where the determination unit determines that the temperature variation of the projection device does not satisfy the predetermined condition.

According to a further aspect of the present invention, there is provided a projection system comprising a plurality of projection devices and a control apparatus configured to control a projection area of each of projection devices, wherein the control apparatus includes at least one or more processors and/or at least one or more electronic circuits that execute operations of each of the following units: a control unit configured to control the projection area of each of the projection devices; and a notification unit configured to perform notification relating to control of the projection areas, in a case where a temperature variation of at least one projection device, among the projection devices, is greater than or equal to a threshold value.

According to another aspect of the present invention, there is provided a control method for a control apparatus that controls a projection area of each of projection devices, the method comprising: controlling the projection area of each of the projection devices; and performing notification relating to control of the projection areas, in a case where a temperature variation of at least one projection device, among the projection devices, is greater than or equal to a threshold value.

According to a further aspect of the present invention, there is provided a control method for a projection device that projects an image onto a projection area, the method comprising: controlling a shape or a position of the projection area; determining whether a temperature variation of the projection device satisfies a predetermined condition; and performs predetermined notification relating to control of the projection area in the controlling, in a case where it is determined in the determining that the temperature variation of the projection device does not satisfy the predetermined condition.

According to another aspect of the present invention, there is provided a non-transitory computer-readable storage medium that stores a program, wherein the program, when executed by at least one processor of a control apparatus that controls a projection area of each of projection devices, causes the at least one processor as: a control unit configured to control the projection area of each of the projection devices; and a notification unit configured to perform notification relating to control of the projection areas, in a case where a temperature variation of at least one projection device, among the projection devices, is greater than or equal to a threshold value.

According to a further aspect of the present invention, there is provided a non-transitory computer-readable storage medium that stores a program, wherein the program, when executed by at least one processor of a projection device for projecting an image onto a projection area, causes the at least one processor as: a control unit configured to control a shape or a position of the projection area; a determination unit configured to determine whether a temperature variation of the projection device satisfies a predetermined condition; and a notification unit configured to perform predetermined notification relating to control of the projection area, in a case where the determination unit determines that the temperature variation of the projection device does not satisfy the predetermined condition.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. It should be noted that the present invention is not limited to the embodiments that will now be described. Also, not all of the constituent elements that are described in the embodiments are necessarily essential to the present invention. The individual functional blocks in the embodiments can be realized by hardware, software or a combination of hardware and software. Also, one functional block may be realized by a plurality of pieces of hardware. Also, one piece of hardware may realize a plurality of functional blocks. Also, one or more functional blocks may be realized by one or more programmable processors (CPU, MPU, etc.) executing computer programs loaded in memory. In the case of realizing one or more functional blocks with hardware, the functional blocks can be realized by a discrete circuit or an integrated circuit such as an FPGA or ASIC.

Note that the following embodiments describe a configuration in which the present invention is applied to a stand-alone projection device (projector). However, it is also possible for electronic devices connected to a projector and capable of controlling the projector to control the projector with a similar method to the following embodiments. For example, electronic devices are typical electronic devices such as personal computers, smartphones, tablet terminals, game machines and digital (video) cameras.

First Embodiment

Configuration of Projection System

Figure 1:
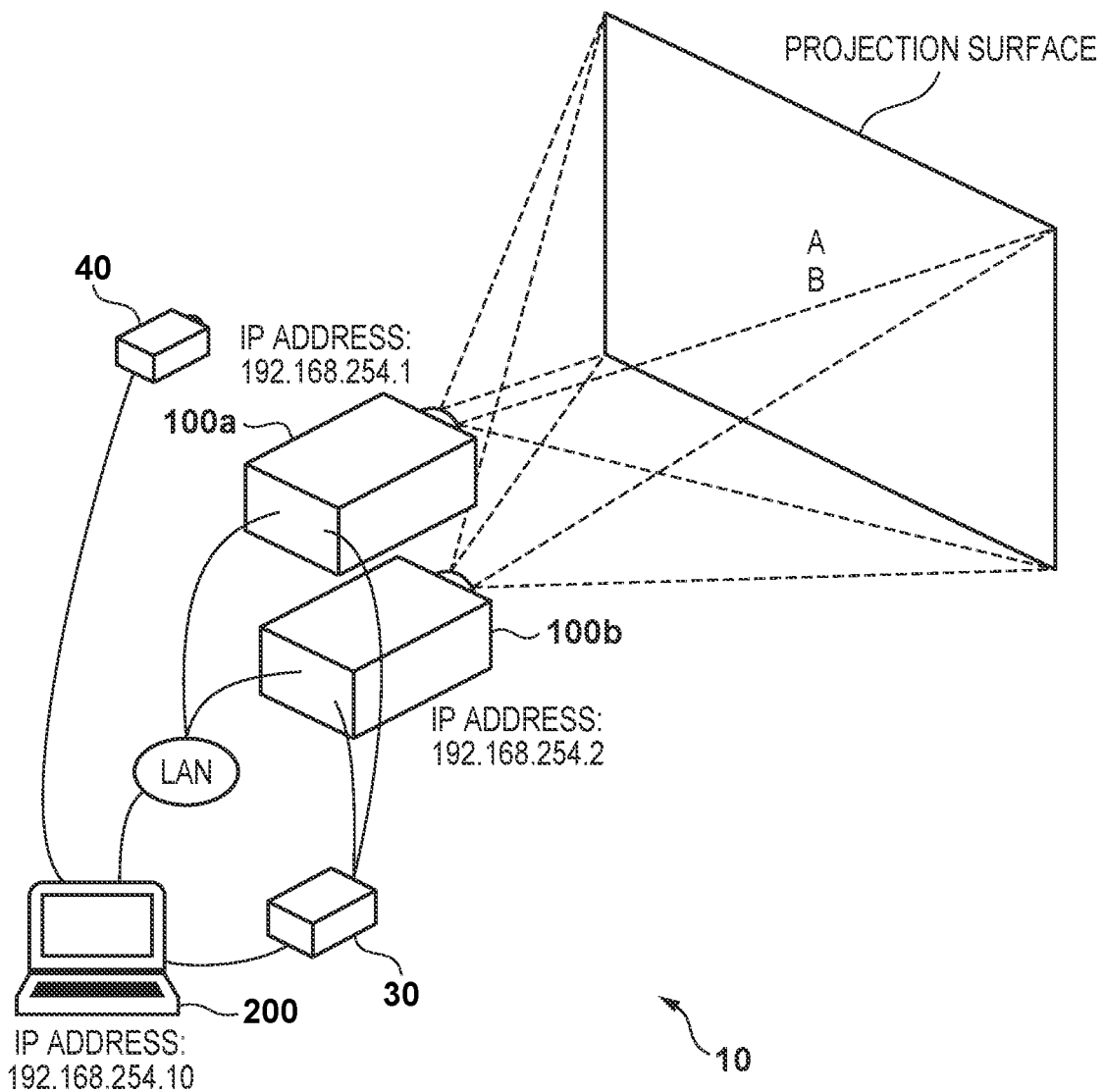
FIG. 1 is a schematic diagram of a projection system according to embodiments.

FIG. 1 is a schematic diagram representing an example of a projection system according to an embodiment of the present invention. A projection system 10 performs stack projection for making projection areas on a projection surface of a plurality of projection devices (hereinafter, projectors) coincident, in order to expand the dynamic range, improve the luminance, or perform 3D display of an optical image. Note that although a projection system that has two (minimum number) projectors 100a and 100b and that makes projection areas A and B coincident is shown in FIG. 1, three or more projectors may be provided.

All the projectors that are included in the projection system 10 are communicably connected to a personal computer (PC) 200. The PC 200 functions as a projection control apparatus of the connected projectors, as a result of one or more processors executing an automatic alignment (automatic adjustment) application. Note that communication between the plurality of projectors and the projection control apparatus may be wired communication or wireless communication, and there is also no particular restriction on the communication protocol. In the present embodiment, it is assumed, as an example, that communication between the devices is performed over a Local Area Network (LAN) that uses TCP/IP as the communication protocol. Also, operations of the projectors 100a and 100b can be controlled, by transmitting predetermined commands from the PC 200 to the projectors 100a and 100b. The projectors 100a and 100b perform operations that depend on the commands received from the PC 200, and transmit the results of operations to the PC 200.

A video distributor 30 distributes video signals that are output by the PC 200 to the projectors 100a and 100b. The video distributor 30 outputs the same video signals to all of the projectors that are connected. Here, the configuration at the time of adjustment before performing projection for viewing is shown, and video that the individual projectors project for viewing is separately supplied to the individual projectors from a playback apparatus or the like. Note that video signals may be directly supplied to the projectors 100a and 100b from the PC 200. Note that video signals can be transmitted based on standards of display interfaces that are typically used. Examples of available standards include HDMI (registered trademark), DVI and VGA.

The projection system 10 further has an image capturing apparatus 40 which is a digital camera, for example. The image capturing apparatus 40 is assumed to be grounded at a position directly opposite the projection surface, so that the entirety of the projection surface is included as the shooting range. The image capturing apparatus 40 is communicably connected to the PC 200 directly or through a LAN. The PC 200 is able to control the operations of the image capturing apparatus 40, by transmitting predetermined commands to the image capturing apparatus 40. For example, the image capturing apparatus 40 is able to shoot according to requests from the PC 200, and to transmit obtained image data to the PC 200.

Also, the terms that are used herein are defined as follows.
Projection area: area of the projection surface occupied by the optical image that is projected by the projectors 100
Projected image: optical image that is projected onto the projection area
Projection image: image represented by the video signal or image data that is output by a signal source (e.g., PC 200)
Multi-projection: projection using a plurality of projection devices
Stack projection: multi-projection in which projection areas are coincident or projected images perfectly overlap
Multi-screen projection: multi-projection in which projection areas are arranged side-by-side such that adjacent projection areas partially overlap
Projector (projection device): device that forms a projected image on the projection surface by modulating light from a light source based on an image for projection and projecting the modulated light onto the projection surface or scanning the modulated light over the projection surface.

Configuration of Projectors 100

Figure 2:
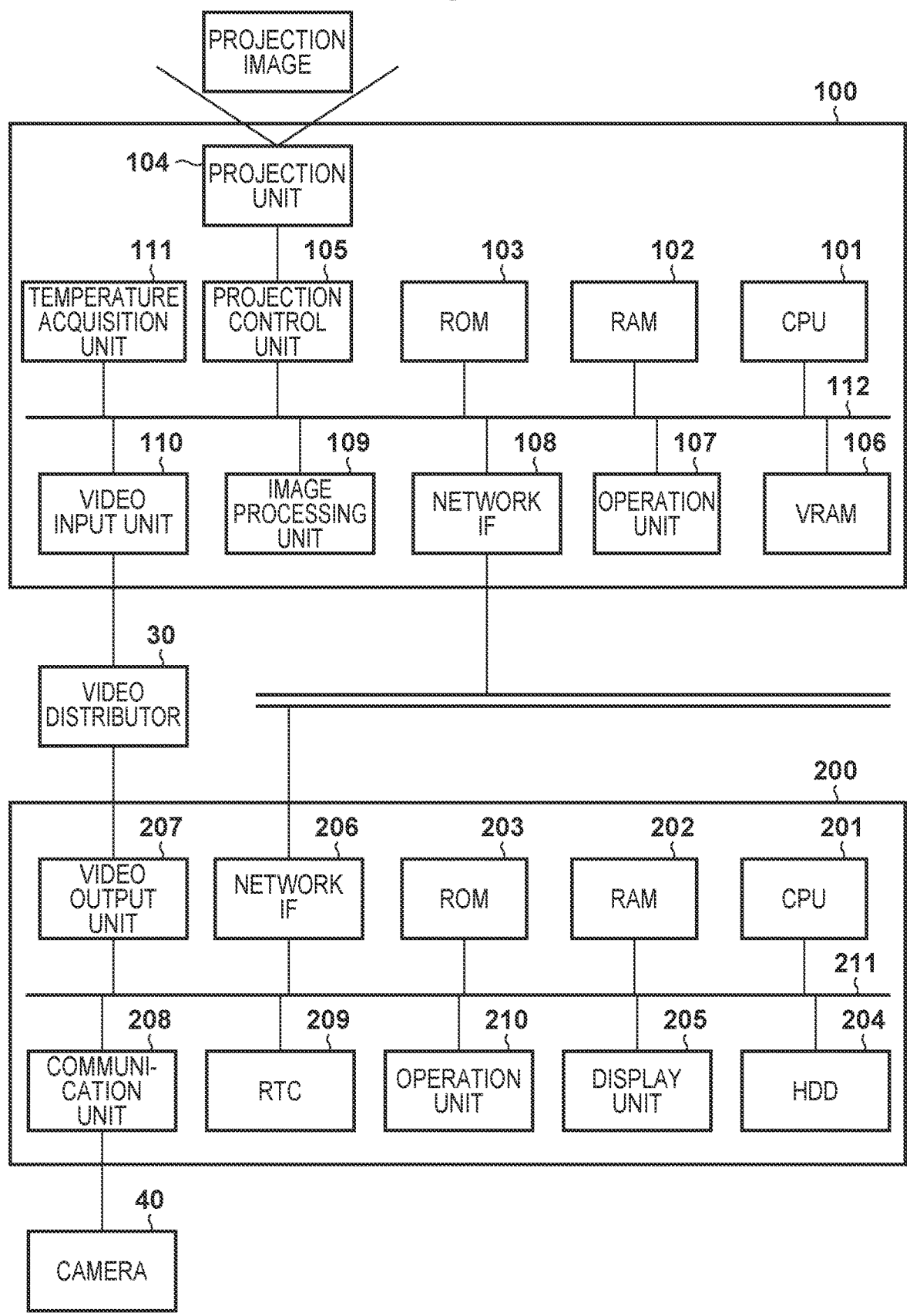
FIG. 2 is a block diagram showing an exemplary functional configuration of the projection system according to the embodiments.

FIG. 2 is a block diagram showing exemplary functional configurations of the projectors 100 and the PC 200 that are included in the projection system 10. The projectors 100 have a CPU 101, a RAM 102, a ROM 103, a projection unit 104, a projection control unit 105, a VRAM 106, an operation unit 107, a network IF 108, an image processing unit 109, a video input unit 110 and a temperature acquisition unit 111. These functional blocks are communicably connected by a system bus 112.

The CPU 101 is an example of a programmable processor, and realizes the operations of the projector 100, by loading programs that are stored in the ROM 103, for example, into the RAM 102 and executing the loaded programs.

The RAM 102 is used as a work memory when the CPU 101 executes programs. The RAM 102 stores programs, variables that are used in executing the programs, and the like. Also, the RAM 102 may be used for other applications (e.g., as a data buffer).

The ROM 103 can be rewritable. The ROM 103 stores programs that are executed by the CPU 101, GUI data for use in displaying menu screens and the like, data of test patterns used in keystone correction, alignment processing and the like, various types of setting values, and the like.

The projection unit 104 has a light source, a projection optical system and the like, and projects optical images based on projection images that are supplied from the projection control unit 105. In the present embodiment, optical images that are based on projection images are generated and projected onto the projection surface by the projection optical system, by using a liquid crystal panel as an optical modulation element, and controlling the reflectance or transmittance of light from the light source in accordance with the projection images.

The projection control unit 105 supplies the data of projection images that is supplied from the image processing unit 109 to the projection unit 104.

The VRAM 106 is a video memory that stores the data of projection images received from the PC 200.

The operation unit 107 has input devices such as keys, buttons, switches, and a touch panel, and accepts instructions for the projector 100 from a user. The CPU 101 monitors operation of the operation unit 107, and, when operation of the operation unit 107 is detected, executes processing that depends on the detected operation. Note that, in the case where the projectors 100 have a remote controller, the operation unit 107 notifies operation signals received from the remote controller to the CPU 101.

The network IF 108 is an interface that connects the projector 100 to a communication network, and has a configuration that is compliant with standards of communication networks that are supported. In the present embodiment, the projectors 100 are connected to a local network that is common to the PC 200, through the network IF 108. Accordingly, communication between the projectors 100 and the PC 200 is performs through the network IF 108.

The image processing unit 109 applies various image processing to video signals supplied to the video input unit 110 and stored in the VRAM 106, and supplies the processed video signals to the projection control unit 105. The image processing unit 109 can be a microprocessor for use in image processing. Alternatively, functions corresponding to the image processing unit 109 may be realized by the CPU 101 executing programs stored in the ROM 103.

Image processing that the image processing unit 109 is capable of applying includes processing such as frame decimation, frame interpolation, resolution conversion, processing for superimposing OSDs such as menu screens, keystone correction and edge blending, but the present invention is not limited thereto.

The video input unit 110 is an interface that directly or indirectly receives video signals that are output by an external device (PC 200 in the present embodiment), and has a configuration that depends on the video signals that are supported. The video input unit 110 includes one or more of a composite terminal, an S-Video terminal, a D terminal, a component terminal, an analog RGB terminal, a DVI-I terminal, a DVI-D terminal and an HDMI (registered trademark) terminal. Also, the video input unit 110, in the case where an analog video signal is received, converts the analog video signal into a digital video signal, and stores the digital video signal in the VRAM 106.

The temperature acquisition unit 111 is a temperature sensor arranged so as to detect the temperature in one or more places of the projector, such as an intake fan, near the projection unit 104 (particularly the light source), or the like. There is no particular restriction on the type of temperature acquisition unit 111, and a unit that directly outputs temperature (in centigrade or Fahrenheit) or a unit that outputs data or signals having a value that depends on the temperature may be applied. Also, a unit whose characteristics (e.g., electrical resistance) vary according to the temperature may be applied. The CPU 101 is able to acquire an output value (temperature information) of the temperature acquisition unit 111 of each location through the system bus 112.

Note that, in the present embodiment, unique temperature information indicating the relationship between the output value of the temperature acquisition unit 111 and the saturation internal temperature (internal temperature in a thermal equilibrium state) is stored in the ROM 103, for example. The unique temperature information can, for example, be measured at the time of manufacture and registered in the ROM 103. The internal temperature can be taken as the output value of the temperature acquisition unit 111 arranged near the light source, for example. Also, the environmental temperature can be taken as the output value (intake air temperature) of the temperature acquisition unit 111 arranged near the intake fan. Note that these are merely examples, and the output values of temperature acquisition units 111 provided in other locations may be used. Also, the internal temperature and the intake air temperature when the temporal variation in internal temperature decreases to less than a threshold value and a state that can be regarded as a thermal equilibrium state is achieved can be associated with each other and registered as unique temperature information. Unique temperature information is registered for a plurality of environmental temperatures. Note that unique temperature information may be measured and registered for a plurality of discrete environmental temperatures, or may be registered as a function of the saturation internal temperature that takes the environmental temperature as a variable. Also, in the case where the projector has a plurality of light source drive modes (full power mode, power-saving mode, etc.), the saturation internal temperature differs depending on the drive mode, and thus unique temperature information is registered for every drive mode.

Note that the CPU 101 may measure unique temperature information when the projector is in actual use, and additionally register the measured unique temperature information in the ROM 103. Also, measurement and registration of unique temperature information may be performed periodically. Also, a configuration may be adopted in which unique temperature information with respect to which the elapsed number of days from the date-time of measurement or registration exceeds a threshold value is deleted. Unique temperature information can be transmitted to the PC 200 as part of the information of the projectors 100, when the projectors 100 are establishing a communication connection with the PC 200, for example. The PC 200 is able to register the unique temperature information in association with the identification information (e.g., MAC Address) of the projectors 100 in an HDD 204, for example. Also, the unique temperature information may be acquired, by transmitting a unique temperature information acquisition command from the PC 200 to the projectors 100.

Note that the relationship between the time period for a thermal equilibrium state to be achieved from when the light source is turned on or started up and the environmental temperature (intake air temperature) may be used as unique temperature information. This is based on the fact that heat is predominantly emitted by the light source among the heat sources of the projector. In this case, unique temperature information can be generated by measuring the time period for the temporal variation in internal temperature to decrease to less than a threshold value and a state that can be regarded as a thermal equilibrium state to be achieved from when the light source is started up in a state where the internal temperature and the intake air temperature are equal, and associating the measured time period with the intake air temperature.

The CPU 101, upon receiving a temperature acquisition command, then responds to the command by transmitting a response including the environmental temperature (intake air temperature) and the elapsed time period from when the light source was most recently started up to the PC 200. Note that the internal temperature may also be transmitted in the response.

Configuration of PC 200

Next, the functional configuration of the PC 200 will be described. The PC 200 may be a general-purpose computer to which an external display can be connected, and accordingly has a functional configuration that is based on a general-purpose computer. The PC 200 has a CPU 201, a RAM 202, a ROM 203, an HDD 204, an operation unit 210, a display unit 205, a network IF 206, a video output unit 207, a communication unit 208 and an RTC 209. Also, these functional blocks are communicably connected by an internal bus 211.

The CPU 201 is an example of a programmable processor, and realizes the operations of the PC 200, by loading programs (OS, application programs, etc.) that are stored in the ROM 203, for example, into the RAM 202 and executing the loaded programs. Processing for performing automatic alignment of projection areas described later is realized by the CPU 201 executing an automatic alignment application.

The RAM 202 is used as a work memory when the CPU 201 executes programs. The RAM 202 stores programs, variables that are used in executing the programs, and the like. Also, the RAM 202 may be used for other applications (e.g., as a data buffer).

The ROM 203 can be rewritable. The ROM 203 stores a program that is executed by the CPU 201, GUI data for use in displaying menu screens and the like, various types of setting values, and the like. Note that the program stored in the ROM 203 is a boot program that is executed at the time of initialization. Large programs such as the OS and application programs are stored in the HDD (hard disk drive) 204, which is a mass storage device, rather than in the ROM 203. When the boot program is executed, the OS is read out to the RAM 202 from the HDD 204 and executed by the CPU 201. Apart from the OS and application programs, user data and the like are saved in the HDD 204. Note that the HDD 204 is an example of a mass storage device, and may be another type of storage device such as an SSD.

The operation unit 210 has input devices such as a keyboard, a pointing device (mouse, etc.), a touch panel and switches, and accepts instructions for the PC 200 from the user. Note that the keyboard may be a software keyboard. The CPU 201 monitors operation of the operation unit 210, and, when operation of the operation unit 210 is detected, executes processing that depends on the detected operation.

The display unit 205 is a liquid crystal panel or an organic EL panel, for example. The display unit 205 displays screens that are provided by the OS and application programs. Note that the display unit 205 may be an external device. Also, the display unit 205 may be a touch display.

The network IF 206 is an interface that connects the PC 200 to a communication network, and has a configuration that is compliant with the standards of communication networks that are supported. In the present embodiment, the PC 200 is connected to a local network that is common to the projectors 100, through the network IF 206. Accordingly, communication between the PC 200 and the projectors 100 is performed through the network IF 206.

The video output unit 207 is an interface that transmits video signals to an external device (projectors 100 or video distributor 30 in the present embodiment), and has a configuration that depends on the video signals that are supported. The video output unit 207 includes one or more of a composite terminal, an S-video terminal, a D terminal, a component terminal, an analog RGB terminal, a DVI-I terminal, a DVI-D terminal, and an HDMI (registered trademark) terminal.

An RTC (Real Time Clock) 209 is a so-called internal clock. Generally, the RTC 209 is battery driven, and continues to operate even when the power of the PC 200 is in an OFF state. Applications that operate in the PC 200 are able to acquire information on the current time from the RTC 209.

Note that, in the present embodiment, the UI screen of an automatic alignment application program that has a function of adjusting the projection areas of the projectors 100 is displayed on the display unit 205, but the UI screen may be displayed on an external device connected to the video output unit 207.

The communication unit 208 is a communication interface for performing serial communication, for example, with an external device, and is typically a USB interface, but may have a configuration that is based on other standards such as RS-232C. In the present embodiment, the image capturing apparatus 40 is connected to the communication unit 208, but there is no particular restriction on the communication method of the image capturing apparatus 40 and the PC 200, and communication that is compliant with any standard that is supported by both devices can be performed.

Video Distributor 30

In the present embodiment, the PC 200, which serves as a projection control apparatus, performs alignment of the individual projectors before multi-projecting images for viewing. Accordingly, the video signals that are transmitted from the PC 200 to the individual projectors are test video signals (test patterns). The video signals to be projected for viewing are separately supplied to the individual projectors. In the present embodiment, the video distributor 30 outputs the same video signals in parallel to all of the projectors that are connected.

Exemplary GUI of Automatic Alignment Application

Figure 3:
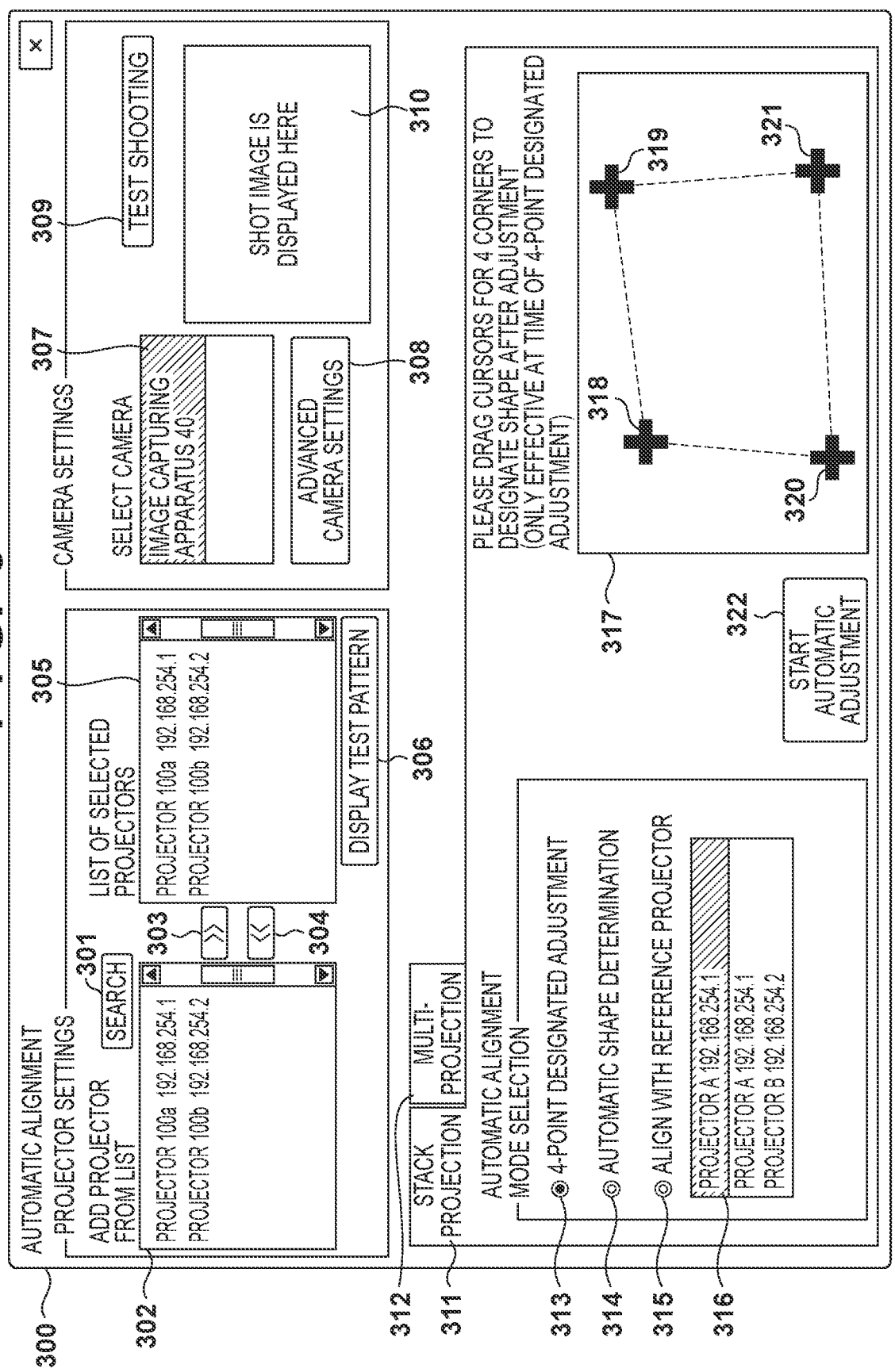
FIG. 3 is a diagram showing an example of a GUI screen of an automatic alignment application according to the embodiments.

FIG. 3 is a diagram showing an example of a GUI screen 300 which is a user interface that is displayed on the display unit 205 as a result of the CPU 201 executing the automatic alignment application program. The user operates the GUI screen 300 through the operation unit 210 of the PC 200. Note that FIG. 3 shows a state in which a tab 311 is selected on the GUI screen 300, and items for use in stack projection are displayed. When a tab 312 is selected, items for use in multi-screen projection are displayed.

A list view 302 is an area in which information on the projectors 100 that are network-connected to the PC 200 are selectably displayed in list form. In the present embodiment, projector names and IP addresses are displayed in list form in the list view 302. This information can be acquired from the projectors 100, by transmitting an information acquisition command from the CPU 201 to each of the projectors 100.

When operation of a Search button 301 is detected, the CPU 201 of the PC 200 broadcasts a predetermined command requesting a projector name and an IP address on the network, via the network IF 206. The predetermined command can be broadcast using a UDP broadcast packet, for example, but broadcasting may be realized with methods that are based on other protocols. The CPU 101 of the individual projectors 100 that are connected to the network transmits data including the projector name and IP address of the projector 100 of the CPU 101 to the PC 200, upon receiving the command via the network IF 108. The CPU 201 of the PC 200 receives the data transmitted in response to the command, extracts the information that is included in the data, and displays the extracted information in list form in the list view 302.

A list view 305 is an area in which the projectors selected for automatic alignment, among the projectors displayed in list form in the list view 302, are displayed in list form. For example, when an operation involving one or more of the elements that are displayed in list form in the list view 302 being dragged and dropped by the user in the list view 305 is detected, the CPU 201 adds the elements that were dragged and dropped to the list view 305. Alternatively, the CPU 201 adds the projectors that are in a selected state in the list view 302 to the list view 305 when operation of an Add button 303 is detected. Also, the CPU 201 deletes the projectors that are in a selected state in the list view 305 from the list view 305 when operation of a Delete button 304 is detected. The information on the projectors that are displayed in the list view 305 is managed on the RAM 202 by the CPU 201.

When operation of a Test Pattern Display button 306 is detected, the CPU 201 transmits a command instructing display of a test pattern through the network IF 206 to each of the projectors 100 that are displayed in the list view 305. There is no particular restriction on the test pattern that is displayed in response to operation of the button 306 as long as the size and position of the display area of each projector 100 can be checked. For example, single color projection images whose color differs for each projector can be used as the test pattern.

In particular, in the case where a large number of projectors are selected, it is not easy to judge with only the display of the list view 305 whether desired projectors have been selected. Thus, the user is able to check that the projectors for alignment have been correctly selected, before performing automatic alignment, by causing a test pattern to be projected from the individual projectors that are selected.

The test pattern may be transmitted from the PC 200 to the individual projectors 100 in association with the command instructing display of the test pattern, or may be generated by the CPU 101 of the projectors 100.

On the other hand, in the case of generating a test pattern in the individual projectors 100, the CPU 101 generates image data representing the abovementioned test pattern, based on the information on the projector 100 of the CPU 101 that is stored in the ROM 103, for example. Note that the abovementioned test pattern may be stored in the ROM 103 in advance.

Returning to FIG. 3, list display is performed in a list view 307 such that one image capturing apparatus currently connected to the PC 200 is selectable. The image capturing apparatus selected here is used in the automatic alignment. In the present embodiment, only the image capturing apparatus 40 is connected, and thus the image capturing apparatus 40 is displayed in a selected state (highlighted state). In the case where a plurality of image capturing apparatuses are connected, the user is able to select one of the image capturing apparatuses that are displayed in list form in the list view 307.

The CPU 201 establishes, with the image capturing apparatus selected in the list view 307, communication for controlling the image capturing apparatus remotely from the PC 200, through the communication unit 208. It thereby becomes possible to acquire various types of information from the selected image capturing apparatus, to instruct shooting, to acquire image data obtained through shooting, and to set (change) the shooting conditions. Also, the CPU 201 stores information acquired from the image capturing apparatus in the RAM 202.

When operation of an Advanced Camera Settings button 308 is detected, the CPU 201 displays a GUI screen for remotely setting the shooting conditions of the image capturing apparatus that is selected in the list view 307 on the display unit 205. Through the GUI screen, the user is able to select an aperture value, a shooting sensitivity, a shutter speed, a shooting resolution (pixel count), and the like. When a value is selected, the CPU 201 transmits a command that includes the selected item and value to an image capturing apparatus through the communication unit 208, and changes the shooting conditions of the image capturing apparatus.

When operation of a Test Shooting button 309 is detected, the CPU 201 starts test shooting processing by the image capturing apparatus that is selected in the list view 307. Test shooting can be the same as moving image shooting for live view display, for example. The shot moving image is displayed in real time on the image display area 310. The user is able to check whether the projection ranges of the projectors selected for automatic alignment all fall within the angle of view of the image capturing apparatus 40, and whether the shooting conditions of the image capturing apparatus 40 and parameters such as white balance are correctly set.

Next, the setting items for stack projection will be described. Reference numerals 313, 314 and 315 denote radio buttons for exclusively selecting an automatic alignment mode. In the present embodiment, the user is able to select one of "4-point designated adjustment", "automatic shape determination", and "align with reference projector" as an automatic alignment mode for stack projection.

"4-point designated adjustment" is a mode for automatically determining a keystone correction amount that results in the vertices of the individual projection areas being aligned with four predetermined points. For example, the CPU 201 movably displays, on a 4-point adjustment area 317, adjustment points 318, 319, 320 and 321 that respectively correspond to the upper left, upper right, lower left and lower right vertices of the projection area. The user is able to designate the coordinates of each vertex of the projection area, by moving the individual adjustment markers, using an operation such as a drag-and-drop operation or a combination of a selection operation and a cursor operation, for example. 4-point designated adjustment is useful in the case where the projection target position is clearly defined, such as in the case where the projection surface is a framed screen, for example. Note that the number of the points whose coordinates are adjustable may be less than four or may be five or more including coordinates other than the vertices.

"Automatic shape determination" is a mode for automatically determining a keystone correction amount that results in the individual projected images being rectangular. In this mode, the CPU 201 determines four points to serves as alignment targets, based on the shot images of the projection areas. The CPU 201 then determines a keystone correction amount that results in the vertices of the individual projection areas being aligned with the four determined points. Thus, an operation by the user designating four points is unnecessary. Automatic shape determination is useful in cases such as where the target position of projection is not clearly defined (e.g., projection onto a large wall surface).

"4-point designated adjustment" and "automatic shape determination" are both processing for automatically determining a keystone correction amount that makes the projection areas of all the projectors coincident with a projection area determined in advance by the user or the CPU 201. In contrast, "align with reference projector" is a mode for taking one projector as a reference projector, and automatically determining a keystone correction amount that results in the projection areas of other projectors being coincident with the projection area of the reference projector. Automatic alignment in this mode is performing in the case where the position of the projection area of the reference projector has been adjusted to a designated position. The keystone correction amount for making the projection areas of projectors other than the reference projector coincident with the projection area of the reference projector is determined automatically.

When an operation selecting the "align with reference projector" radio button 315 is detected, the CPU 201 copies the information of the projectors that are displayed in the list view 305 to a list view 316. Selection of a reference projector may be performed automatically, or a configuration may be adopted in which the user is able to make the selection. For example, the projector listed at the head of the list view 316 is taken as the reference projector, and the user is able to changeably configure the order within the list by a drag-and-drop operation or the like, but other suitable configurations can be adopted. The projector with the smallest keystone correction amount can also be automatically set as the reference projector, with reference to the list that is managed in the RAM 202 by the CPU 201.

When operation of an Automatic Adjustment Start button 322 is detected, the CPU 201 starts automatic alignment processing that depends on the radio button that is selected.

Automatic Alignment Processing

Figure 4:
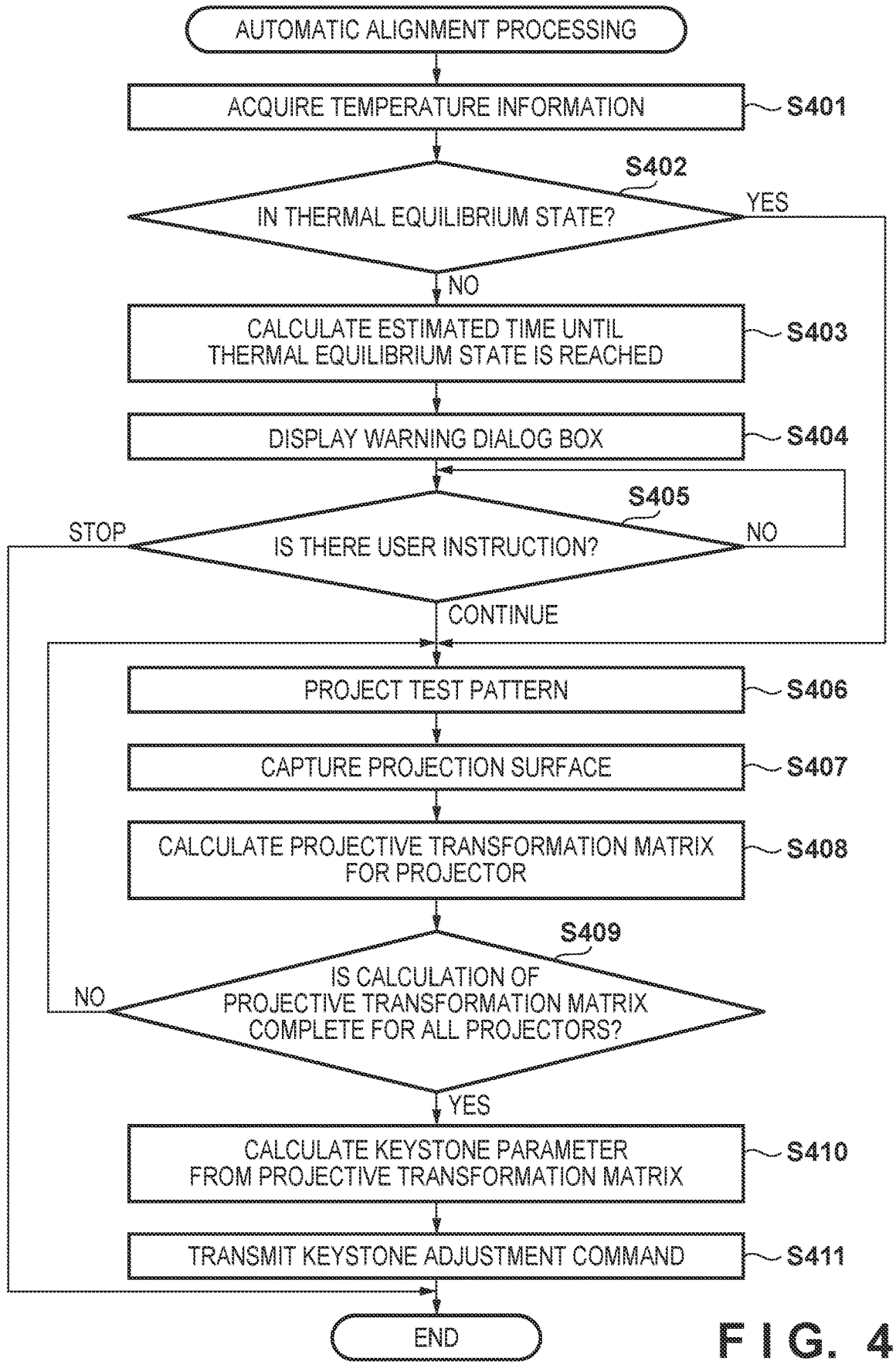
FIG. 4 is a flowchart of automatic alignment processing according to a first embodiment.

FIG. 4 is a flowchart relating to the automatic alignment processing that is executed by the CPU 201 of the PC 200 in the present embodiment. The automatic alignment processing is started in response to operation of the Automatic Adjustment Start button 322 on the GUI screen 300 being detected. This processing is realized, for example, by the CPU 201 executing the automatic alignment application or the functions of the OS that are utilized by the automatic alignment application. Here, the case where the projectors 100a and 100b are selected for automatic alignment and automatic alignment by 4-point designated adjustment is performed will be described. Also, it is assumed that the unique temperature information of the projectors 100a and 100b has already been acquired and is registered in the HDD 204 of the PC 200.

In step S401, the CPU 201 transmits a temperature acquisition command to the projectors (here, projectors 100a and 100b) that perform automatic alignment, via the network IF 206. In response to receiving the command, the CPU 101 of the projectors transmits the output value (temperature information) of the individual temperature acquisition units 111. Here, communication between the PC 200 and a specific projector is performed based on TCP, but other protocols may be used. Note that the CPU 101 of the projectors, in response to receiving a temperature acquisition command, may acquire temperature information and transmit a response including the acquired temperature information, or may transmits a response using the temperature information most recently acquired and held in the RAM 102, for example. Also, the CPU 101 of the projectors may transmit a response including the respective temperature information with information indicating the portion to which the respective temperature information relates. When temperature information is acquired from all of the projectors to which the temperature acquisition command was transmitted, the CPU 201 stores the temperature information in the RAM 202, for example, and advances the processing to step S402.

Figure 5A:
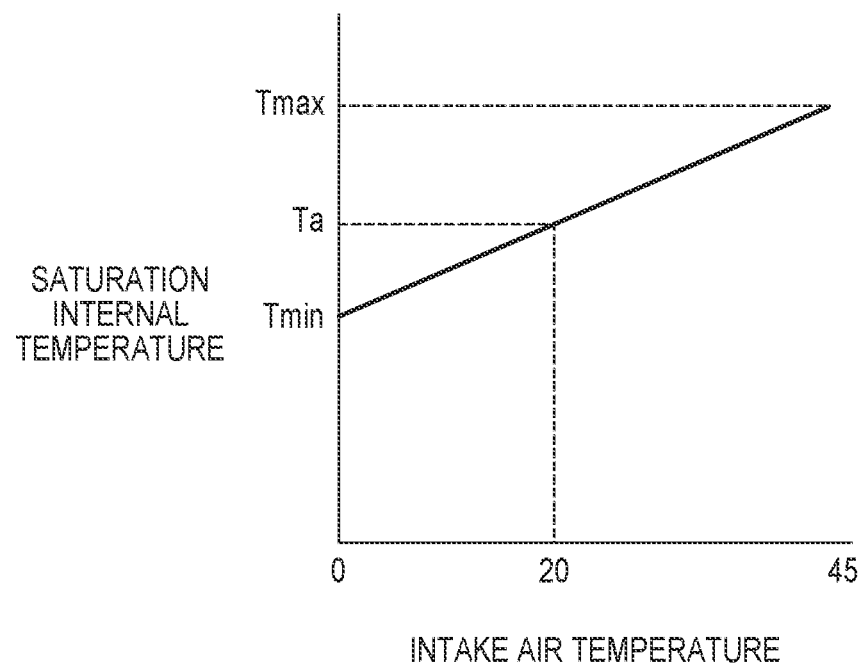
FIGS. 5A and 5B are diagrams showing an example of information that is used in determination relating to a thermal equilibrium state and acquisition of an estimated time period in the embodiments.

In step S402, the CPU 201 determines, for each of the projectors that perform alignment, whether the projector is in a thermal equilibrium state, from the unique temperature information that is registered in the HDD 204 and the temperature information acquired in step S401. FIG. 5A is a diagram showing an example of the unique temperature information of a projector. As described earlier, the unique temperature information is information indicating, for a plurality of different intake air temperatures, the relationship between the intake air temperature (environmental temperature) and the saturation internal temperature (internal temperature (temperature near the light source) in the thermal equilibrium state). Here, in order to facilitate understanding and description, the unique temperature information is shown in the form of a continuous graph, but is actually registered in the form of a plurality of discrete values or a function.

The CPU 201 refers to the unique temperature information, out of the temperature information acquired in step S401, using the intake air temperature, and acquires corresponding saturation internal temperature. Here, in the case where there is no unique temperature information corresponding to the acquired intake air temperature, saturation internal temperature corresponding to the acquired intake air temperature may be derived, by interpolating plural pieces of unique temperature information relating to neighboring intake air temperatures. The CPU 201 then compares the saturation internal temperature that is obtained based on the unique temperature information with the internal temperature out of the temperature information acquired in step S401. The CPU 201 determines, with regard to a certain projector, that the projector is in a thermal equilibrium state if the internal temperature acquired in step S401 matches the saturation internal temperature obtained based on the intake air temperature and the unique temperature information, or if the difference therebetween is sufficiently small (absolute value of the difference is less than a threshold value).

Note that, in the case where the projectors have a plurality of light source drive modes, the CPU 101 of the projectors 100 also includes information relating to the current light source drive mode together with the temperature information in a response. The CPU 201 of the PC 200 then acquires the saturation internal temperature for that projector using the unique temperature information corresponding to the light source drive mode, and determines whether the projector is in a thermal equilibrium state.

Note that in the case where a combination of the environmental temperature (intake air temperature) and the elapsed time period from when the light source was most recently started up is used as the unique temperature information, the CPU 201, in step S402, derives an elapsed time period for the thermal equilibrium state to be achieved at the intake air temperature acquired in step S401 from the unique temperature information. The CPU 201 then compares the elapsed time period derived based on the unique temperature information with the elapsed time period acquired in step S401. If the elapsed time period acquired in step S401 is greater than or equal to the elapsed time period derived based on the unique temperature information, the CPU 201 determines that the projector is in a thermal equilibrium state.

Note that it is also possible for the CPU 201 to determine that a projector is in a thermal equilibrium state, in the case where the temperature of the projector indicated by the acquired temperature information is included in a predetermined saturation temperature range. In this case, the CPU 201 determines that a projector is not in a thermal equilibrium state, in the case where the temperature of the projector indicated by the acquired temperature information is not included in the predetermined saturation temperature range.

In step S402, the CPU 201 only advances the processing to step S406 in the case where it is determined that all of the projectors that perform alignment are in a thermal equilibrium state. In other words, the CPU 201 advances the processing to step S403 if even one projector is not determined to be in a thermal equilibrium state. The CPU 201 is configured to advance the processing to step S406 for projectors that are determined to be in a thermal equilibrium state, and to advance the processing to step S403 for projectors that are not determined to be in a thermal equilibrium state.

Figure 5B:
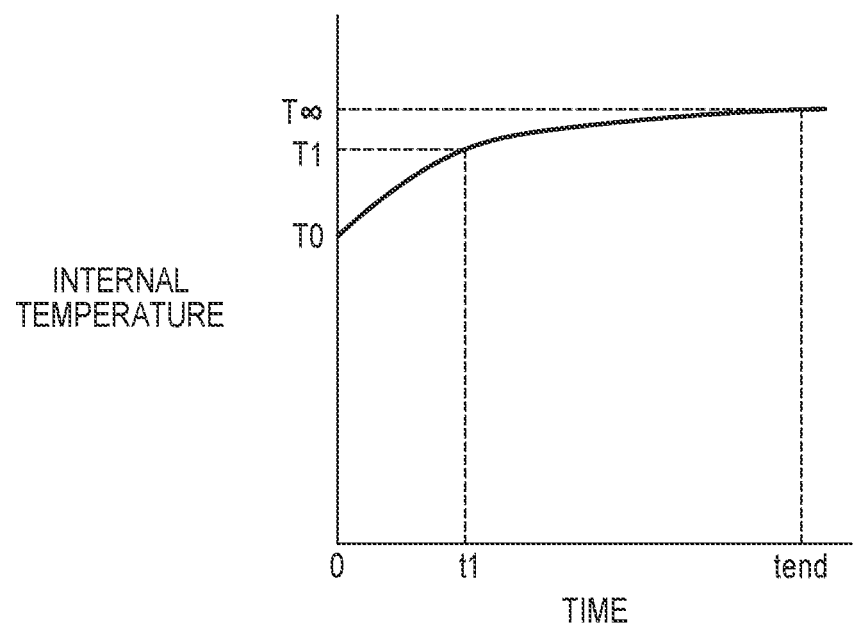

In step S403, the CPU 201 derives, for each of the projectors that are not in a thermal equilibrium state, an estimated time period (the first time) required to achieve the thermal equilibrium state. For example, the CPU 201 derives an estimated time period for the thermal equilibrium state to be achieved, from information (internal temperature information) relating to the variation in internal temperature from when the light source is started up until when the inside of the projector achieves the thermal equilibrium state, such as shown in FIG. 5B, and the internal temperature acquired in step S401. Internal temperature information can be measured for a plurality of environmental temperatures (intake air temperatures) and registered in the ROM 103, at the time of manufacture, for example, of the projectors 100. After the PC 200 has established communication with the projectors 100, the internal temperature information can then be acquired from the projectors 100 and stored in the HDD 204, for example.

For example, in the case where the internal temperature acquired from the projector 100 is T1, the CPU 201 specifies an elapsed time period t1 from when the light source was most recently started up, with reference to the internal temperature information shown in FIG. 5B. The CPU 201 is then able to derive a difference tend−t1 between an elapsed time period tend for achieving a thermal equilibrium state T∞ and t1 as the estimated time period (the first time) for the thermal equilibrium state to be achieved.

As described above, the transition of the internal temperature is dependent on an internal temperature T0 at the time that the light source is started up, that is, the environmental temperature (intake air temperature). Thus, the CPU 201 derives the estimated time period using internal temperature information corresponding to the intake air temperature acquired from the projectors in step S401. In the case where internal temperature information corresponding to the acquired environmental temperature is not registered, internal temperature information generated through interpolation from plural pieces of internal temperature information for close environmental temperatures can be used.

Also, in the present embodiment, the estimated time period for the thermal equilibrium state to be achieved is derived, based on the current internal temperature and internal temperature information. However, the elapsed time period from when the light source was most recently started up may be acquired from the projector, and the difference between this elapsed time period and the time period required to achieve the thermal equilibrium state from when the light source is started up, which is registered in advance, may be derived as the estimated time period. Different environmental temperatures (intake air temperatures) can also be measured and registered in the ROM 103 at the time of manufacture, for example, with regard to the time period required to achieve the thermal equilibrium state from when the light source is started up.

Figure 6A:
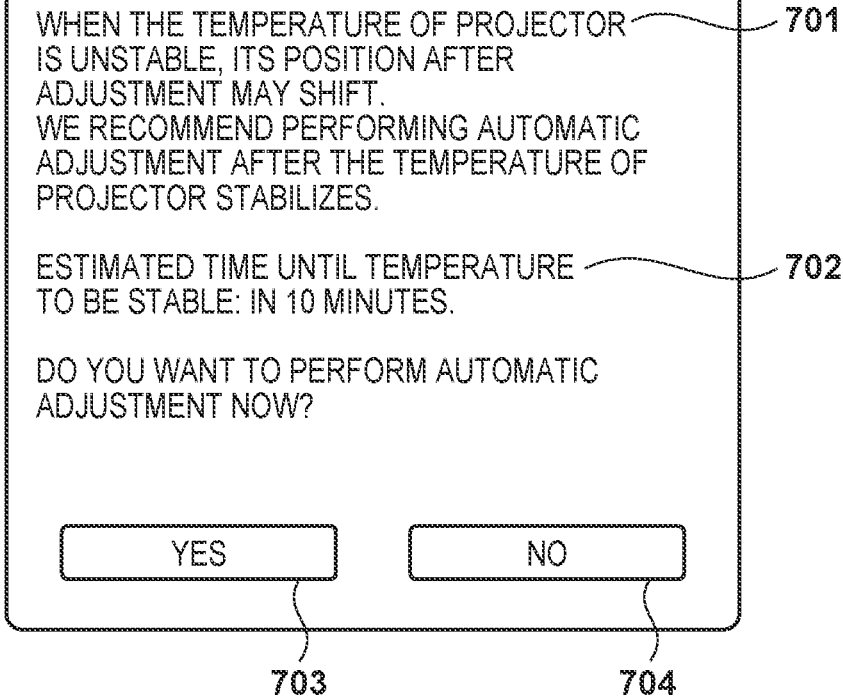
FIGS. 6A and 6B are diagrams showing an example of GUI screens of the automatic alignment application according to the embodiments.

When the estimated time period for the thermal equilibrium state to be achieved is derived, the CPU 201, in step S404, displays a warning dialog box such as shown in FIG. 6A, for example, on the display unit 205. The warning dialog box displays a message 701 notifying that the state of the projectors is not suitable for automatic alignment. The warning dialog box also includes a message 702 advising an approximate time period to wait for a state suitable for automatic alignment to be achieved. The approximate time period is the estimated time period derived in step S403. Note that in the case where a plurality of projectors are determined to not be in a thermal equilibrium state, the longest estimated time period, among the estimated time periods derived for the individual projectors, is displayed as the approximate time period. Note that the warning dialog box may also include information indicating the projectors that are not in a state suitable for automatic alignment. Furthermore, the warning dialog box includes a Yes button 703 for instructing to continue the automatic alignment and a No button 704 for instructing to interrupt the automatic alignment.

In this way, in the present embodiment, in the case where it is determined that there is a projector that is not in a thermal equilibrium state, among the plurality of projectors that perform automatic alignment, the user is informed, before performing automatic alignment, that the projectors are not in a state suitable for performing automatic alignment. Thus, the problem of the projection position shifting despite having performed automatic alignment, as a result of the user performing automatic alignment without being aware that the projectors are in a state not suitable for automatic alignment, can be suppressed. Furthermore, since an approximation of the time period required to achieve a state suitable for automatic alignment is presented to the user, time and effort involved in repeatedly performing and interrupting automatic alignment until the warning dialog box is no longer displayed can be saved, and the waiting time can be utilized effectively.

In step S405, the CPU 201 determines whether operation of one of the Yes button 703 and the No button 704 of the warning dialog box has been detected. In the case where it is determined that a processing interruption instruction (operation of the No button 704) has been detected, the CPU 201 ends the automatic alignment processing, and again displays the GUI screen 300 shown in FIG. 3 on the display unit 205.

In the case where operation of the Yes button is detected in step S405, the CPU 201 advances the processing to step S406. Also, if operation of the Yes button 703 or the No button 704 has not been detected, the CPU 201 repeats execution of step S405.

In step S406, the CPU 201 causes one of the plurality of projectors that perform alignment to project a test pattern. Specifically, the CPU 201 is able to cause a projector to display a test pattern, by displaying a test pattern on the display unit 205, and supplying an image of the test pattern to the video distributor 30 through the video output unit 207. Note that in order to cause only a specific one of the projectors to display the test pattern, the CPU 201, before supplying the image to the video distributor 30, transmits a control command via the network IF 206 to the projectors that will not be caused to display the test pattern, and sets these projectors to a state in which video display is not performed. Note that it is possible to transmit the control command using a protocol such as TCP, for example.

In step S407, the CPU 201 controls the image capturing apparatus 40 via the communication unit 208 to shoot an image of the projection surface including the projection area. Note that the shooting range of the image capturing apparatus 40 is adjusted in advance through test shooting. The image capturing apparatus 40 transmits the data of the shot image to the PC 200. The CPU 201 stores the received image data in the RAM 202.

In step S408, the CPU 201 calculates a projective transformation matrix for the projector that was caused to display the test pattern, based on the image data acquired in step S407. The projective transformation matrix is a matrix for performing projective transformation from a camera coordinate system to a panel coordinate system of the projector. The CPU 201 detects a plurality of feature points of the test pattern projected in step S406 from the image data acquired in step S407. The CPU 201 then calculates a projective transformation matrix based on the positions of the feature points in the camera coordinate system and the positions of the feature points in the panel coordinate system.

In step S409, the CPU 201 determines whether a projective transformation matrix has been calculated for all of the projectors that perform alignment, and advances the processing to step S410 if it is determined to have been calculated. The CPU 201, if there is a projector for which a projective transformation matrix has not been calculated, executes the processing of steps S406 to S408 for that projector.

In step S410, the CPU 201 calculates a keystone parameter for each of the projectors that perform alignment. The keystone parameter is a parameter for geometrically deforming the projection area. The CPU 201 detects the vertex coordinates of the projection area from the shot image data of the projection area, and calculates a keystone parameter that results in the vertices of the projection area being at the positions designated by the adjustment points 318, 319, 320 and 321 of the 4-point adjustment area 317 in FIG. 3. The keystone parameter can be calculated from the vertex coordinates of the detected projection area, the projective transformation matrix calculated in step S408, and the coordinates designated by the adjustment points 318, 319, 320 and 321.

In step S411, the CPU 201 transmits a control command that includes the keystone parameter calculated in step S410 to the target projectors via the network IF 206. The CPU 101 of the projectors that receive the control command executes keystone adjustment processing based on the keystone parameter that is included in the control command. The projection areas of the individual projectors are thereby positionally aligned with the coordinates designated by the adjustment points 318, 319, 320 and 321. Thus ends the automatic alignment processing.

Variations

Note that the determination of step S402 as to whether the projector is in a thermal equilibrium state may be performed with other methods. For example, the temperature information of the projector 100 may be periodically acquired from the PC 200 (CPU 201) or log data of the internal temperature may be acquired, and it may be determined that the projector is in a thermal equilibrium state if the magnitude of the most recent temporal variation in internal temperature is less than a threshold value. Alternatively, it may be determined that the projector is not in a thermal equilibrium state if the magnitude of the most recent temporal variation in internal temperature is greater than or equal to the threshold value.

Also, a configuration may be adopted in which the projector 100 (CPU 101) derives the temporal variation in internal temperature instead of the PC 200 (CPU 201). In this case, the PC 200 acquires the magnitude of the most recent temporal variation in internal temperature from the projector 100, and, if the acquired magnitude is less than a threshold value, is able to determine that the projector 100 is in a thermal equilibrium state.

Even with these techniques, the estimated time period can be derived in step S403, as long as information indicating the relationship between the magnitude of the temporal variation and the time period required for the thermal equilibrium state to be achieved is registered in advance for a plurality of different environmental temperatures.

Also, the determination of whether the individual projectors are in a thermal equilibrium state (step S402) and the processing for deriving an estimated time period for projectors that are not in a thermal equilibrium state to achieve the thermal equilibrium state (step S403) were described as being performed by the PC 200. However, each projector may perform similar processing when a temperature acquisition command is received from the PC 200, for example. In this case, information on whether the projector is in a thermal equilibrium state and the estimated time period for the thermal equilibrium state to be achieved in the case where the projector is not a thermal equilibrium state can be included in the response to the temperature acquisition command.

In this way, according to the present embodiment, when performing automatic alignment of the projection areas of a plurality of projectors, it is checked whether there are projectors that are determined to not be in a thermal equilibrium state. In the case where there is a projector that is determined to not be in a thermal equilibrium state, the user is then informed, before performing automatic alignment, that the projectors are not in a state suitable for performing automatic alignment. Situations where the user performs automatic alignment without knowing that the projectors are in a state not suitable for performing automatic alignment can thereby be suppressed.

Furthermore, in the case where there is a projector that is determined to not be in a thermal equilibrium state, an expected time period for a state suitable for performing automatic alignment to be achieved is derived and informed to the user. Thus, for the duration until the expected time period elapses, the user is able to perform other processing and to use the time effectively, resulting in good usability.

Second Embodiment

Next, a second embodiment of the present invention will be described. In the present embodiment, in the case where there is a projector that is determined to not be in a thermal equilibrium state, among the projectors that perform alignment, performance of automatic alignment can be scheduled. The configuration of the projection system and the GUI screen of the automatic alignment application can be in common with the first embodiment. Accordingly, the present embodiment will also be described using FIGS. 1 to 3.

First, temperature monitor processing that is performed by the projectors in the present embodiment will be described using the flowchart of FIG. 7A. In the temperature monitor processing, the CPU 101 starts execution at the start of projection (at startup of the light source), for example.

In step S801, the CPU 101 acquires the current temperature information from the temperature acquisition unit 111, via the system bus 112. The acquired temperature information may be stored in the RAM 102 as a temperature log in association with time information (e.g., elapsed time period from when the light source was most recently started up), for example.

In step S802, the CPU 101 determines whether the inside of the projector is in a thermal equilibrium state, and, if it is not determined to be is in a thermal equilibrium state, derives an estimated time period for the inside of the projector to achieve a thermal equilibrium state, and stores this estimated time period in the RAM 102. This processing can be similar to that performed by the CPU 201 of the PC 200 in steps S402 and S403 in the first embodiment. Note that the estimated time period is 0 seconds in the case where it is determined that the inside of the projector is in a thermal equilibrium state.

In the present embodiment, processing such as determining whether the projector is in the thermal equilibrium state and calculating the estimated time period may be performed, using the elapsed time period from when the light source was most recently started up, the magnitude of the temporal variation in internal temperature, and the like, similarly to in the first embodiment. For example, the CPU 101 is able to fit the data of the temperature log generated in the RAM 102 to an equation for calculating a temperature rise curve that is stored in the ROM 103 in advance, and calculate a temperature rise curve such as shown in FIG. 5B. The CPU 101 is then able to determine the estimated time period required to achieve the thermal equilibrium state as tend–t1 with respect to the current elapsed time period t1.

In step S803, the CPU 101 repeats the processing from step S801, after waiting a predetermined time period. In this way, in the present embodiment, the projector 100 periodically performs acquisition of temperature information and acquisition of the estimated time period for the thermal equilibrium state to be achieved (or determination of whether the projector is in the thermal equilibrium state), and stores the acquired information in the RAM 102.

Next, the automatic alignment processing of the PC 200 in the present embodiment will be described, using the flowchart of FIG. 7B. In FIG. 7B, the same reference numerals as FIG. 4 are given to steps for performing that is the same as the first embodiment. In the present embodiment, the CPU 201 starts the automatic alignment processing shown in the flowchart of FIG. 7B, in response to operation of the Automatic Adjustment Start button 322 on the GUI screen 300 in FIG. 3 being detected, similarly to in the first embodiment. Also, the CPU 201 performs alignment of the projectors 100a and 100b.

In step S821, the CPU 201 transmits a control command requesting an estimated time period for the thermal equilibrium state to be achieved to the projectors 100a and 100b via the network IF 206, and acquires an estimated time period from each projector. At this time, the CPU 101 of each projector responds by transmitting a response including the estimated time period acquired in step S802 (0 sec if it is determined that the projector is already in the thermal equilibrium state) to the PC 200.

In step S822, the CPU 201 determines whether all of the projectors that perform alignment are in the thermal equilibrium state. The CPU 201 then advances the processing to step S406 if it is determined that all of the projectors are in the thermal equilibrium state, and advances the processing to step S823 if it is not determined that this is the case (if there is even one projector that is not in the thermal equilibrium state). Specifically, the CPU 201 is able to determine that all of the projectors that perform alignment are in the thermal equilibrium state, if the estimated time periods that are acquired are all 0 seconds.

Figure 6B:
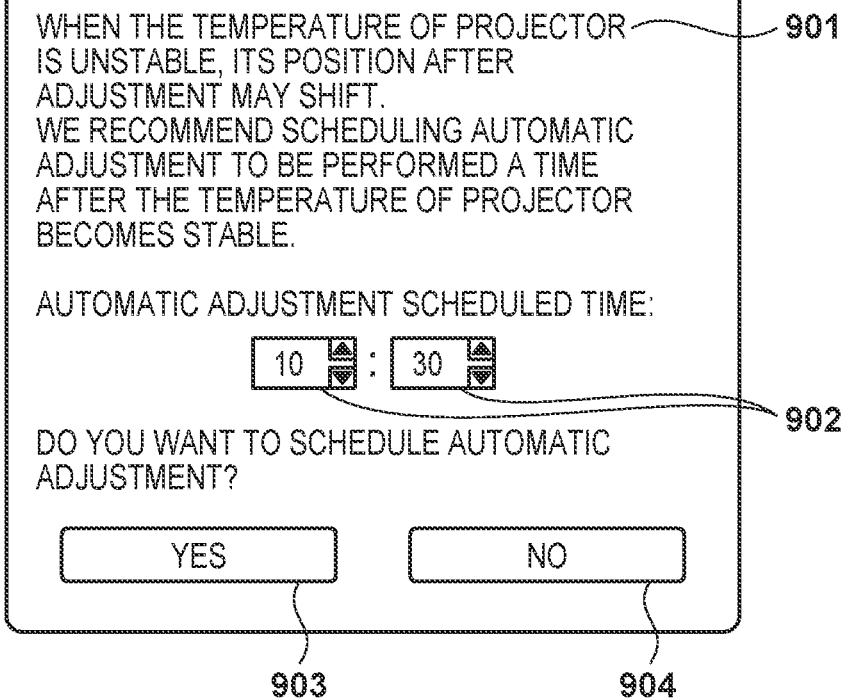

In step S823, the CPU 201 displays a scheduling dialog box such as shown in FIG. 6B on the display unit 205. A message 901 notifying that the state of the projectors is not suitable for automatic alignment and that a time on or after the time at which it is estimated that the projectors will achieve a state suitable for automatic alignment can be designated to schedule performance of automatic alignment is displayed in the scheduling dialog box. Furthermore, a spin button 902 for setting a scheduled time is displayed in the scheduling dialog box. The spin button 902 displays a time obtained by adding the longest estimated time period among the estimated time periods acquired in step S821 to the current time acquired from the RTC 209 (i.e., earliest possible scheduled time) as an initial value of the scheduled time. The earliest possible scheduled time (henceforth, also referred to as the "estimated time") is the earliest time at which it is estimated that all of the projectors that perform automatic alignment will have achieved a state suitable for performance of automatic alignment. The scheduled time (the second time) is changeable through operation of the spin button 902, but cannot be changed to a time earlier than the scheduled time that is displayed as the initial value. A Yes button 903 and a No button 904 for instructing performance and interruption of scheduling are also displayed in the scheduling dialog box.

In this way, in the present embodiment, the user is informed in the case where it is determined that there is a projector in a state that is not suitable for performance of automatic alignment, among the projectors that perform automatic alignment, similarly to in the first embodiment. Furthermore, in the present embodiment, the user is able to easily schedule performance of automatic alignment to a time on or after the time at which it is estimated that all of the projectors that perform automatic alignment will have achieved a state suitable for performance of automatic alignment. Thus, automatic alignment is appropriately performed, even if the user forgets the estimated time at which all of the projectors that perform automatic alignment will have achieved a state suitable for performance of automatic alignment. Also, the scheduled time can be set to a time on or after the estimated time, thus enabling a time that suits the user to be set.

In step S824, the CPU 201 determines whether operation of one of the Yes button 903 and the No button 904 of the scheduling dialog box has been detected. In the case where it is determined that a processing interruption instruction (operation of the No button 904) has been detected, the CPU 201 ends the automatic alignment processing, and again displays the GUI screen 300 shown in FIG. 3 on the display unit 205.

In the case where operation of the Yes button 903 is detected in step S824, the CPU 201 advances the processing to step S825, acquires the designated scheduled time, and stores this scheduled time in the RAM 202. Also, if operation of one of the Yes button 903 or the No button 904 is not detected, the CPU 201 repeats execution of step S824.

In step S826, the CPU 201 acquires the current time from the RTC 209, and determines whether the scheduled time stored in the RAM 202 has arrived. The CPU 201 repeats execution of step S826 if it is not determined that the scheduled time has arrived, and advances the processing to step S406 when it is determined that the scheduled time has arrived. The processing of steps S406 and S407 is as described in the first embodiment.

In step S829, the CPU 201 determines whether shooting of an image of the projection area has been performed for all of the projectors that perform automatic alignment. The CPU 201 advances the processing to step S830 if it is determined that shooting has been completed, and performs the processing of steps S406 and S407 for one projector for which shooting has not been completed if it is not determined that shooting has been completed.

In step S830, the CPU 201 evaluates the shot images of the projection areas of the projectors, and determines whether alignment is required. Since the images are shot with the same image capturing apparatus 40, it is possible to find out the degree to which the projection positions of the projectors are shifted, by comparing the shift in the positions of the projection areas with the images. For example, the CPU 201, for all of the projectors that perform alignment, derives the maximum amount of shift in the coordinates of each vertex of the projection area, and, if the maximum amount of shift is less than or equal to a predetermined threshold value for all of the vertices, determines that alignment is unnecessary and ends the automatic alignment processing. On the other hand, if the maximum amount of shift is larger than the threshold value, the CPU 201 determines that automatic alignment is required, and advances the processing to step S831. Step S831 is the same processing as step S409, except for the number of the projectors for which a projective transformation matrix is calculated. Also, the processing of steps S410 and S411 is as described the first embodiment.

Note that the present embodiment describes a case where the substantive contents of the automatic alignment processing from step S406 onward partially differs from the first embodiment. However, a configuration may be adopted in which exactly the same processing as the first embodiment is executed from step S406 onward.

In this way, in the present embodiment, in a state that is not suitable for performing automatic alignment, a time on or after the time at which it is estimated that a state suitable for automatic alignment will be achieved can be designated to schedule automatic alignment, in addition to informing the user that the projectors are in a state that is not suitable for performing automatic alignment. Thus, in addition to the effects of the first embodiment, automatic alignment is appropriately performed even if the user is not present at the estimated time, and usability also improves.

Third Embodiment

Next, a third embodiment of the present invention will be described. The present embodiment relates to the case where there is one projector that performs alignment. The configurations of the projector 100 and the PC 200 can be in common with the first embodiment. The GUI screen of the automatic alignment application can also be the same as the first embodiment. Accordingly, description is also given using FIGS. 2 and 3 in the present embodiment.

Figure 8:
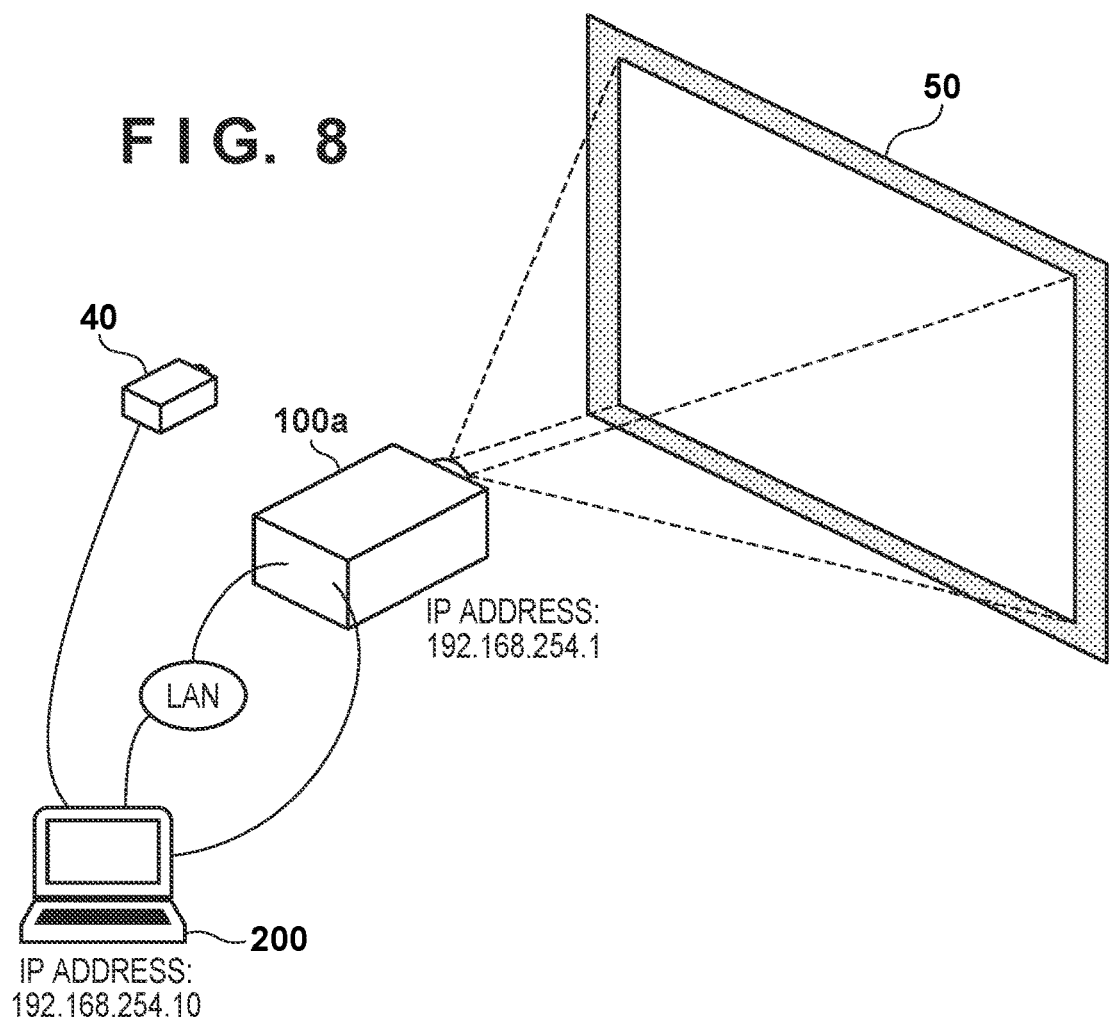
FIG. 8 is a schematic diagram of a projection system according to a third embodiment.

FIG. 8 is a schematic diagram showing an outline of the projection system in the present embodiment similarly to FIG. 1. In the present embodiment, the PC 200 performs automatic alignment so as to align the projection area of the one projector 100 with the frame of a screen 50.

In the present embodiment, the user selects the "4-point designated adjustment" mode of the radio button 313, and moves the adjustment points 318, 319, 320 and 321 of the 4-point adjustment area 317 so as to be aligned with the corresponding vertices of the frame of the screen 50 through a drag-and-drop operation, for example.

Figure 7A:
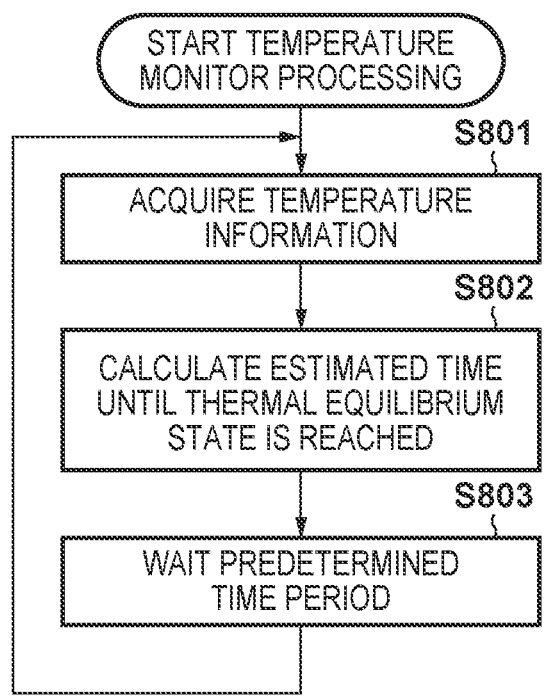
FIGS. 7A and 7B are flowcharts of automatic alignment processing according to a second embodiment.
Figure 7B:
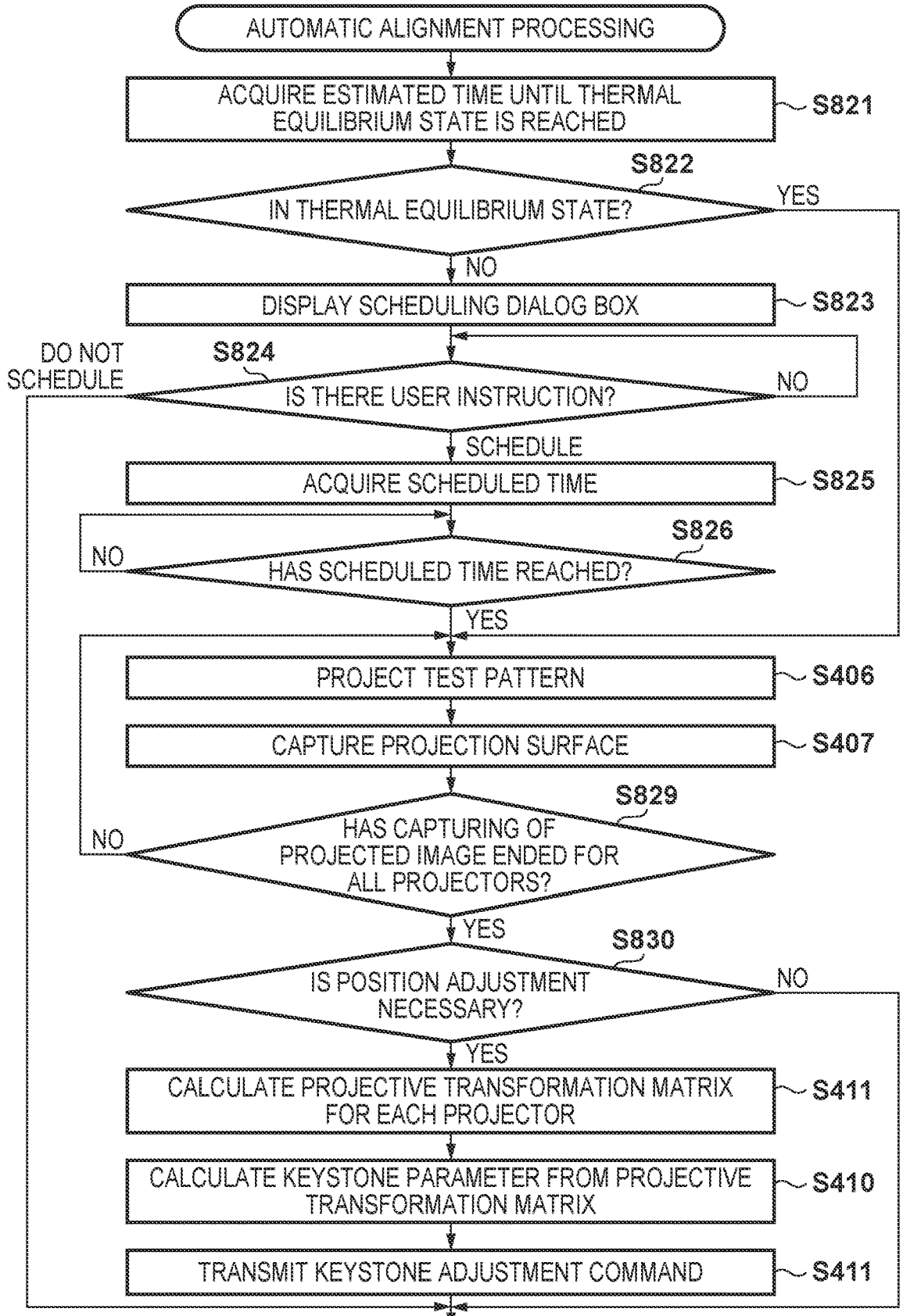

In the present embodiment, the CPU 101 of the projector 100 executes the temperature monitor processing shown in FIG. 7A, similarly to in the second embodiment.

Although the automatic alignment processing that is executed by the CPU 201 of the PC 200 is basically the same as the processing of the second embodiment shown in FIG. 7B, the operation of step S823 differs in part. The second embodiment is configured such that the scheduled time cannot be set to an earlier time than the estimated time at which all of the projectors that perform alignment will have achieved a thermal equilibrium state. On the other hand, in the present embodiment, in the case where there is one projector that performs alignment, a time prior to the time at which it is estimated that the projector will achieve a thermal equilibrium state can be designated to schedule performance of automatic alignment.

In the case of performing stack projection or multi-screen projection with a plurality of projectors, a shift in the projection positions between the projectors tends to be noticeable, and the sense of sharpness of the projected image is markedly impaired. On the other hand, in the case where there is one projector, a shift in the projection position tends not to be noticeable, and the sense of sharpness of the projected image is not impaired even if the projection position shifts. Thus, it is possible to prioritize performing automatic alignment while allowing a certain amount of position shift. For example, in the case where alignment needs to be completed before the estimated time at which the projector will achieve a thermal equilibrium state, the user is able to set the latest time possible within a permissible range to schedule performance.

Figure 9:
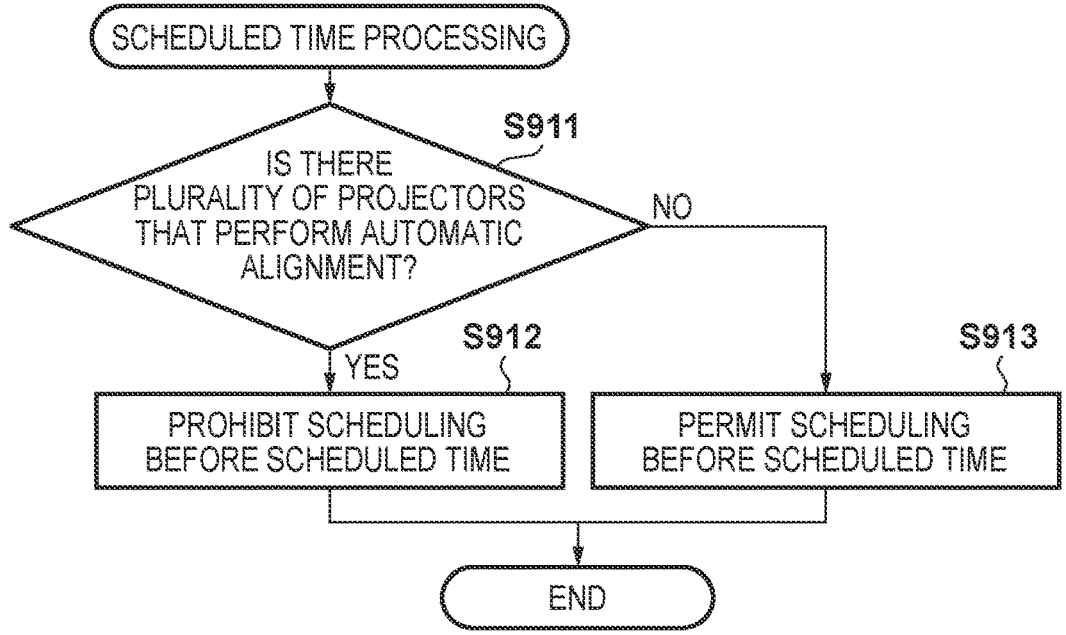
FIG. 9 is a flowchart relating to the third embodiment.

Accordingly, in the present embodiment, the CPU 201, as shown in the flowchart of FIG. 9, executes scheduled time processing for setting restriction of the scheduled time on/off when displaying the scheduling dialog box. In step S911, the CPU 201 determines whether there are a plurality of projectors that perform automatic alignment, and advances the processing to step S912 if it is determined that there are a plurality of such projectors, and to step S913 if it is not determined that there are a plurality of such projectors. Here, the CPU 201 is able to determine that there are a plurality of projectors that perform automatic alignment, if a plurality of the projectors are displayed in the list view 305.

In step S912, the CPU 201 prohibits scheduling of a time prior to the estimated time at which all of the projectors that perform automatic alignment will have achieved a thermal equilibrium state. For example, the CPU 201 performs control such that a scheduled time earlier than the estimated time cannot be set, even when operation of the spin button 902 winding the time back is detected.

On the other hand, in step S913, the CPU 201 permits scheduling of a time prior to the estimated time at which all of the projectors that perform automatic alignment will have achieved a thermal equilibrium state. For example, the CPU 201 performs control such that a time earlier than the current time cannot be set, in the case where operation of the spin button 902 winding the time back is detected.

According to the present embodiment, if there is one projector that performs automatic alignment, a time prior to the estimated time at which the thermal equilibrium state will be achieved can be designated to schedule performance of automatic alignment. Thus, in the case where a shift in the projection position after automatic alignment has little effect, automatic alignment can be performed with priority given to the intensions of the user. Note that, in the first embodiment, automatic alignment is immediately performed in the case where there is an instruction to continue the automatic alignment from the warning dialog box, whereas, in the present embodiment, automatic alignment is performed at the time that the scheduled time arrives. Thus, automatic alignment is performed in a state closely approaching a thermal equilibrium state. The present embodiment can also be implemented as part of the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-39643, filed on Mar. 6, 2018, which is hereby incorporated by reference herein in its entirety.

What is claimed is:

1. A control apparatus that controls a projection area of each of projection devices, comprising:
a controller configured to:
control the projection area of each of the projection devices;
determine whether a temperature variation of each of the projection devices is greater than or equal to a threshold value based on an elapsed time period from when a light source of each of the projection devices starts up; and
perform notification relating to control of the projection areas, in a case where the temperature variation of at least one projection device, among the projection devices, is greater than or equal to the threshold value,
wherein the controller performs the notification by causing a message to be displayed on a display device.

2. The control apparatus according to claim 1, wherein the controller notifies, to a user, information relating to a time at which the temperature variation of a projection device whose temperature variation is determined to be greater than or equal to the threshold value will be less than the threshold value.

3. The control apparatus according to claim 2, wherein the controller notifies, to the user, information relating to the time, based on an output value of a temperature sensor provided in the projection device whose temperature variation is determined to be greater than or equal to the threshold value.

4. The control apparatus according to claim 2, wherein the controller notifies, to the user, information relating to the time, based on an elapsed time period from when a light source of the projection device whose temperature variation is determined to be greater than or equal to the threshold value starts up.

5. The control apparatus according to claim 1, wherein the controller is further configured to perform alignment processing for controlling the projection area of each of the projection devices, such that the projection area of each of the projection devices is located in a predetermined area.

6. The control apparatus according to claim 5, wherein the controller is further configured to:
receive user input of a second time for starting performance of the alignment processing, the second time is greater than or equal to a first time at which the temperature variation of a projection device whose temperature variation is determined to be greater than or equal to the threshold value will be less than the threshold value, wherein
the controller starts performance of the alignment processing at the second time received by the receiving unit.

7. The control apparatus according to claim 5,
wherein the controller notifies information indicating that performance of the alignment processing is not appropriate to a projection device whose temperature variation is determined to be greater than or equal to the threshold value, among the plurality of projection devices.

8. The control apparatus according to claim 1,
wherein the controller is further configured to perform an adjustment processing for projection areas such that the each of projection areas of the projection devices overlaps with another projection area on a projection surface.

9. The control apparatus according to claim 5, wherein
the controller is further configured to display an image for instructing whether or not the controller performs the alignment processing, in a case where a temperature variation of at least one projection device, among projection devices, is greater than or equal to the threshold value, and
the controller performs the alignment processing in a where an instruction for performing the adjustment processing is inputted.

10. A projection device for projecting an image onto a projection area, comprising:
a controller
configured to:
control a shape or a position of the projection area;
determine whether a temperature variation of the projection device is less than a threshold value based on an elapsed time period from when a light source of each of the projection devices starts up; and
perform predetermined notification relating to control of the projection area, in a case where the controller determines that the temperature variation of the projection device is not less than the threshold value,
wherein the controller performs the predetermined notification by sending a message to a control apparatus of the projection device.

11. A projection system comprising a plurality of projection devices and a control apparatus configured to control a projection area of each of projection devices,
wherein the control apparatus includes a controller configured to
control the projection area of each of the projection devices;
determine whether a temperature variation of each of the projection devices is greater than or equal to a threshold value based on an elapsed time period from when a light source of each of the projection devices starts up; and
perform notification relating to control of the projection areas, in a case where a temperature variation of at least one projection device, among the projection devices, is greater than or equal to a threshold value,
wherein the controller performs the notification by causing a message to be displayed on a display device.

12. A control method for a control apparatus that controls a projection area of each of projection devices, the method comprising:
controlling the projection area of each of the projection devices;
determining whether a temperature variation of each of the projection devices is greater than or equal to a threshold value based on an elapsed time period from when a light source of each of the projection devices starts up; and
performing notification relating to control of the projection areas, in a case where a temperature variation of at least one projection device, among the projection devices, is greater than or equal to the threshold value,
wherein the performing comprises causing a message to be displayed on a display device.

13. A control method for a projection device that projects an image onto a projection area, the method comprising:
controlling a shape or a position of the projection area;
determining whether a temperature variation of the projection device is less than a threshold value based on an elapsed time period from when a light source of each of the projection devices starts up; and
performing predetermined notification relating to control of the projection area in the controlling, in a case where it is determined in the determining that the temperature variation of the projection device is not less than the threshold value,
wherein the performing the predetermined notification comprises sending a message to a control apparatus of the projection device.

14. A non-transitory computer-readable storage medium that stores a program, wherein the program, when executed by at least one processor of a control apparatus that controls a projection area of each of projection devices, causes the at least one processor to function as:
a controller configured to
control the projection area of each of the projection devices;
determine whether a temperature variation of each of the projection devices is greater than or equal to a threshold value based on an elapsed time period from when a light source of each of the projection devices starts up; and perform notification relating to control of the projection areas, in a case where a temperature variation of at least one projection device, among the projection devices, is greater than or equal to the threshold value, wherein the controller performs the notification by causing a message to be displayed on a display device.

15. A non-transitory computer-readable storage medium that stores a program, wherein the program, when executed by at least one processor of a projection device for projecting an image onto a projection area, causes the at least one processor to function as:

a controller configured to control a shape or a position of the projection area;

determine whether a temperature variation of the projection device is less than a threshold value based on an elapsed time period from when a light source of each of the projection devices starts up; and perform predetermined notification relating to control of the projection area, in a case where the controller determines that the temperature variation of the projection device is not less than the threshold value, wherein the controller performs the predetermined notification by sending a message to a control apparatus of the projection device.

* * * * *